April 14, 1942.  C. A. NERACHER  2,280,002
FLUID DRIVE
Filed June 2, 1939  3 Sheets-Sheet 1
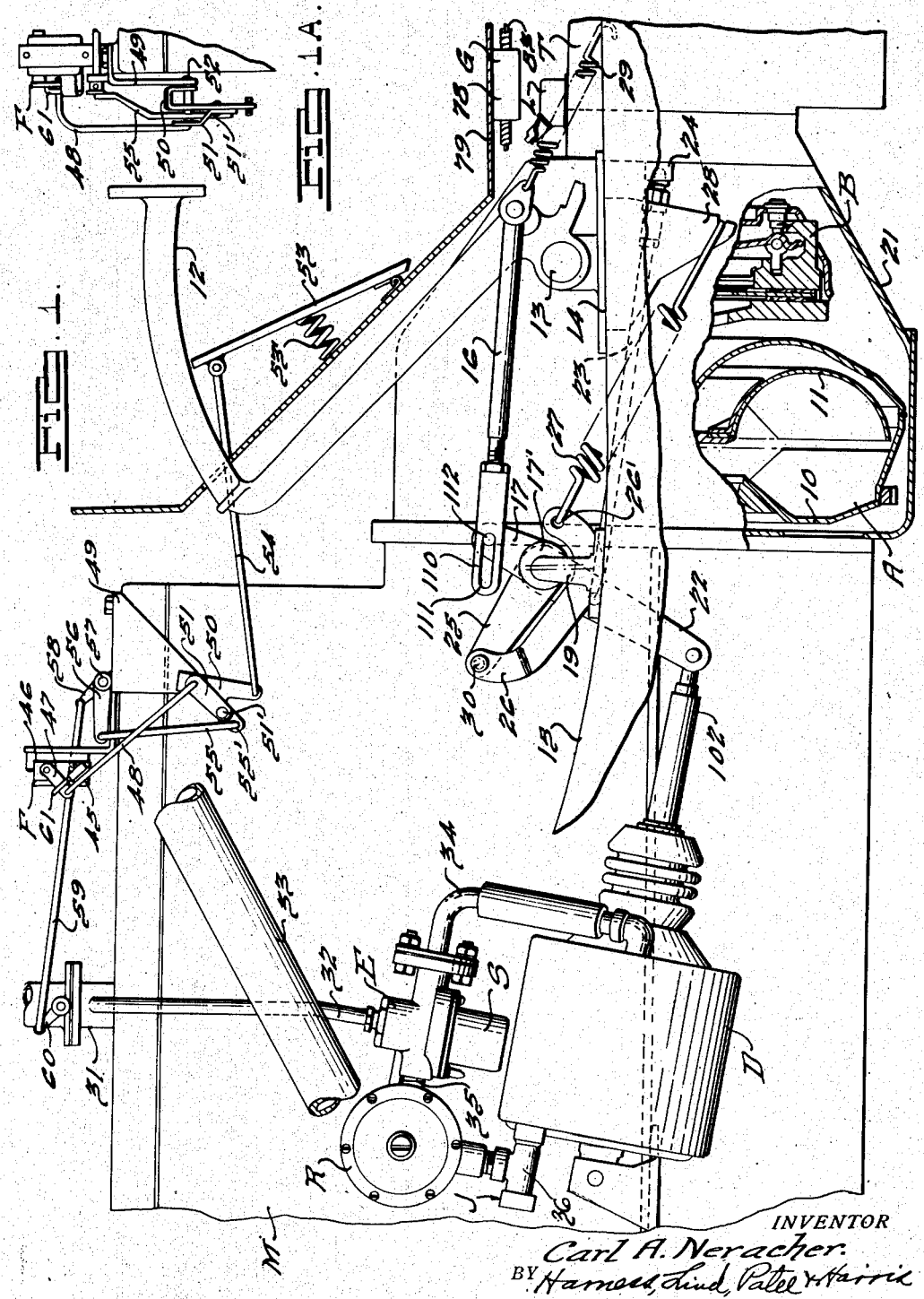
INVENTOR
Carl A. Neracher.
BY Harness, Dind, Patee & Harris
ATTORNEYS.

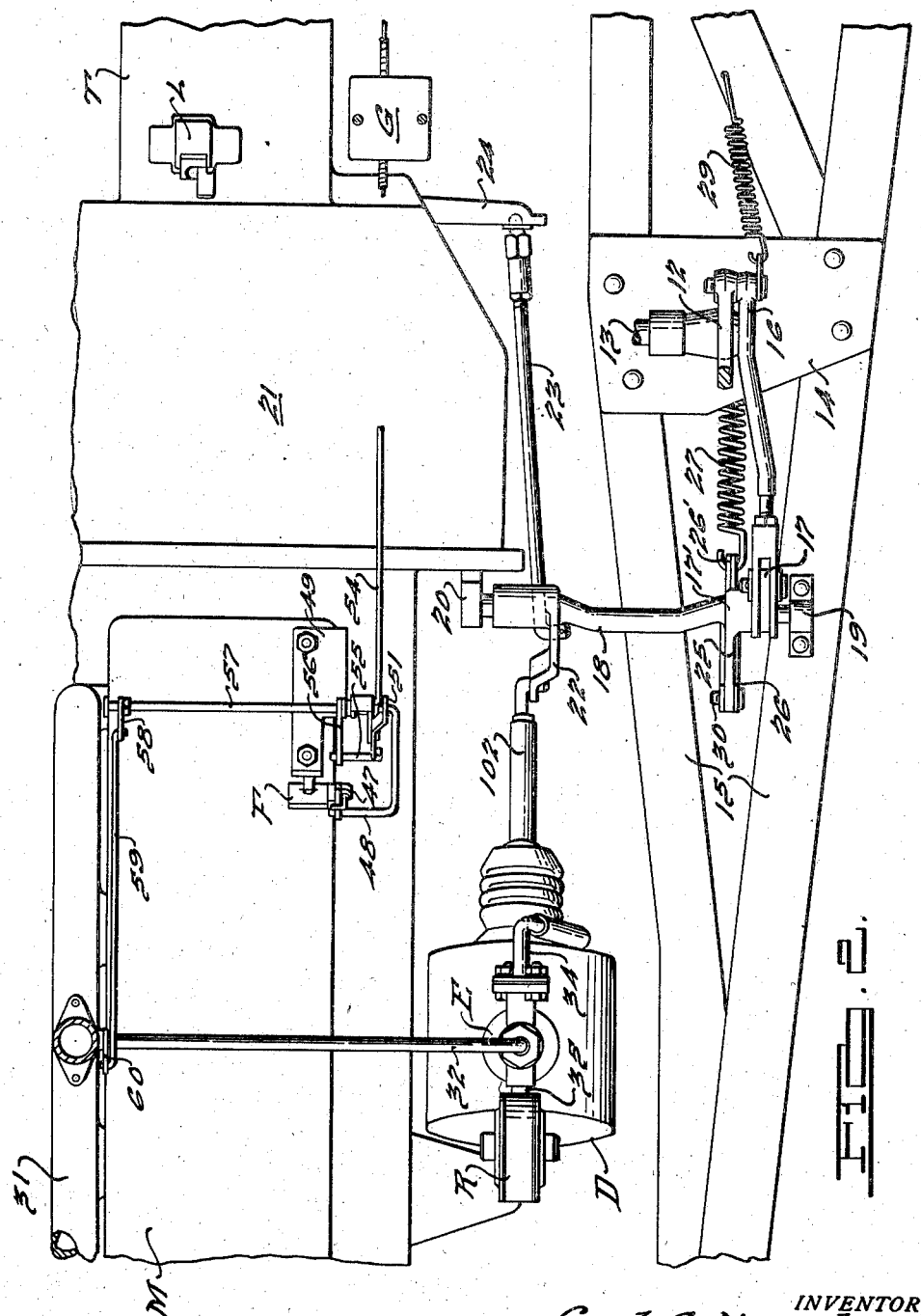

April 14, 1942.  C. A. NERACHER  2,280,002
FLUID DRIVE
Filed June 2, 1939  3 Sheets-Sheet 3
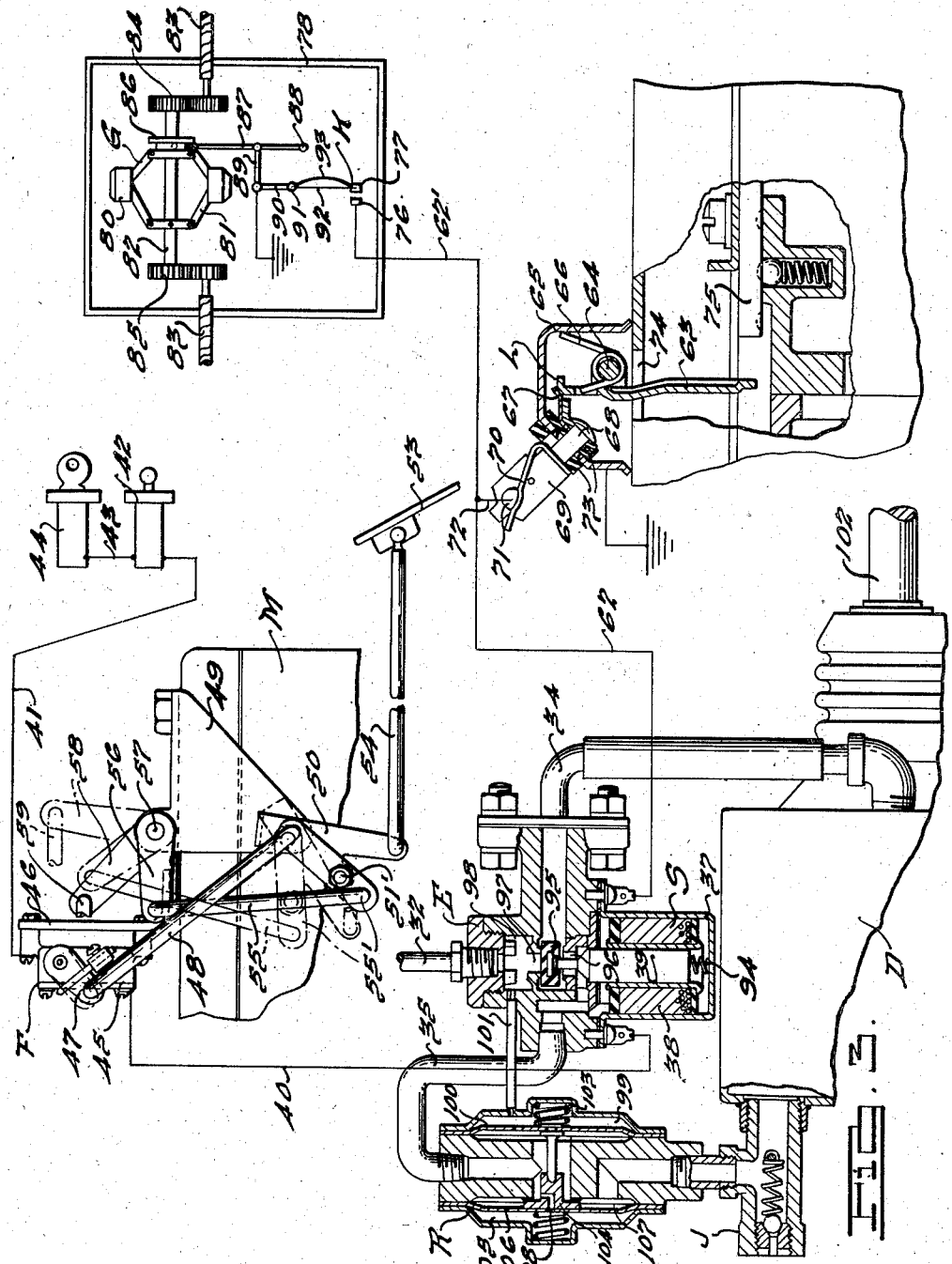
INVENTOR
Carl A. Neracher
BY Harness, Lind, Patee & Harris
ATTORNEYS.

Patented Apr. 14, 1942

2,280,002

UNITED STATES PATENT OFFICE 2,280,002

FLUID DRIVE

Carl A. Neracher, Detroit, Mich., assignor to Chrysler Corporation, Highland Park, Mich., a corporation of Delaware Application June 2, 1939, Serial No. 277,047

7 Claims. (Cl. 192—.01)

This invention relates to motor vehicle drive mechanism. More particularly, it relates to power operated control mechanism for motor vehicles having a fluid coupling for connecting the engine to the transmission mechanism thereof.

The primary object of the invention is to provide in a drive employing a fluid coupling, a releasing device for automatically releasing the drive of the fluid coupling when it is desired to shift gears and when the vehicle is stopped or is traveling at an extremely slow speed with the throttle closed.

Other objects and advantages will be apparent from the following description.

The invention will be described with reference to the accompanying drawings which show an illustrative embodiment thereof.

In the drawings, Fig. 1 is a fragmentary side elevational view of a vehicle power plant with some of the parts broken away to show internal construction.

Fig. 1A is a fragmentary rear elevational view of the accelerator actuated linkage of Fig. 1.

Fig. 2 is a plan view of the apparatus shown in Fig. 1.

Fig. 3 is a diagrammatic view of the various parts of the apparatus illustrating the electrical and fluid connections between said parts.

In a vehicle power transmission employing a fluid coupling, or fluid clutch as these devices are sometimes called, it is not necessary to break the drive when the vehicle comes to a stop due to the inherent "slip" between the drive and driven elements of the fluid coupling. The type of fluid coupling used in present day motor vehicles is especially constructed to provide a relatively high slip at low speeds of rotation in order to minimize the driving tendency at low engine speeds and cut down the amount of power that must be absorbed within the coupling during the time that the vehicle is at rest with the transmission connected and the engine operating.

In spite of such provision, a severe heating problem is sometimes encountered under conditions when the engine is allowed to idle for long periods with the transmission in gear and the vehicle parked. It is the practice of some drivers to idle the engine for long periods in order to warm the car body from the heater and under such conditions, the fluid coupling is required to absorb a considerable quantity of power for a long time. This power is, of course, dissipated in heat which causes the temperature of the fluid in the coupling to rise with consequent expansion thereof.

The present invention provides means for automatically disconnecting the runner of the fluid coupling from the input shaft of the transmission whenever the vehicle comes to a stop with the throttle closed.

The invention also provides means for automatically disconnecting the drive for shifting the transmission gears thereby preventing clashing thereof, as frequently occurs due to the drag of the fluid in the fluid coupling.

Referring to Fig. 1, it will be seen that I have illustrated the drive releasing means as consisting of a friction clutch B operated by a vacuum-actuated servo-motor D, but it is desired to point out that other types of drive releasing means may be used, such as a dog clutch or other device and various other types of servo-motors, such as those actuated by air, oil or electric current, may be substituted for my vacuum motor.

In Fig. 1, drive from the vehicle motor M is transmitted to the change speed transmission T through a fluid coupling A which may be of any suitable type. A friction clutch B is provided for disconnecting the drive of the fluid coupling runner from the transmission when desired. While various types of fluid couplings and friction clutches may be used, it is preferred to employ a coupling and clutch unit like that described and claimed in the application of Arthur J. Phelan et al., Serial No. 274,240, filed in the United States Patent Office on May 17, 1939, which has issued as Patent No. 2,182,407, dated Dec. 5, 1939.

Referring to the drawings, in which like reference characters designate like parts in the following description, Fig. 1 illustrates, in side elevation, a motor vehicle power plant which comprises a motor M of the internal combustion type. The motor M is drivingly connected to the impeller 10 of a fluid coupling A, the runner 11 of said coupling being connected to the input shaft of the change speed transmission T through the friction clutch B. The transmission T may be of the conventional manual shift type, or it may be of the automatic type, or a combined manual and automatic transmission may be used.

The friction clutch B is adapted to be manually controlled by a pedal 12 which operates through a linkage about to be described, but it is preferred to control the clutch B automatically by the fluid actuated motor D which is interconnected with said linkage.

Pedal 12 is mounted on a shaft 13 journaled in the bracket 14 carried by the chassis sill 15. Forward movement of pedal 12 is transmitted by means of a link 16 to the upstanding arm 17 of a bellcrank 17' carried by a cross-shaft 18 which is journaled at one end in a bracket 19 carried by the outer chassis rail, and at its other end in a bracket 20 supported on the clutch housing 21. The latter end of cross-shaft 18 has a downwardly extending lever 22 which carries one end of a compression link 23, the rearward end of which is connected to the release fork 24 of the clutch B. It can thus be readily seen that forward movement of pedal 12 about shaft 13 will produce a corresponding forward movement of link 16 which, in turn, will rotate cross-shaft 18 counterclockwise and thus actuate link 23 rearwardly to effect a disengagement of clutch B.

Upon release of pedal 12, the clutch pressure springs (not shown) will engage the clutch and return the linkage to the position shown in Fig. 1, assisted by the pedal return spring 29.

An over-center spring 27 is provided to decrease the effort required to effect disengagement of the clutch, this spring being arranged so that it exerts rotative force on the rod 18 during manual operation thereof and during power operation also. Spring 27 is attached at its rearward end to the downwardly extending portion 28 of the bracket, 14, and its forward end is attached at 26' to one end of a U-shaped link 26 pivotally carried at 30 by the arm 25 of the bellcrank 17'.

The bellcrank 17' and link 26 are so arranged that no rotative force is exerted by the spring 27 on the rod 18 when the parts are in their Fig. 1 position with the clutch B engaged. As can be seen from Fig. 1, when the parts are in the position shown, the force of spring 27 is effective along a straight line passing through the pivot 30, the axis of the cross rod 18 and the point 26', thus no turning force is exerted by the spring. However, as soon as the rod 18 has been initially rotated in a counterclockwise direction, either by the pedal 12 or by the power means about to be described, the arm 25 of bellcrank 17' will be moved downwardly and the line of force of spring 27 which always passes through the points 30 and 26' will no longer intersect the axis of rod 18. Spring 27 will then exert a downward force on the arm 25 tending to rotate rod 18 counterclockwise and assist in effecting disengagement of clutch B.

The motor M is equipped with the usual intake manifold 31 which furnishes a supply of vacuum for the motor D through the pipe 32 disposed adjacent the steering column 33. Vacuum from the manifold 31 enters the motor D through a solenoid controlled valve E which connects pipe 32 with one side of the motor D through pipe 34. The other side of the motor D is connected to valve E through a regulator valve R which communicates with valve E through pipe 35 and with motor D through a suitable coupling 36.

Valve E is controlled by a solenoid S (see Fig. 3) which may be energized from the vehicle battery through suitable switches which will be presently described.

Referring to Fig. 3, in which figure the regulator valve R has been turned 90° from its position as illustrated in Figs. 1 and 2 for the sake of clarity, it may be seen that the valve E and its control solenoid S are shown in closed position with the vacuum supply pipe 32 closed off from communication with the cylinder of motor D. This is the position of the parts when the clutch B is engaged.

Solenoid S is provided with the usual field coil 38 which is connected through wire 40 to one side of a make-and-break switch F, the latter being connected through wire 41, switch 42 and wire 43 to the vehicle ignition switch 44 which is in turn connected to one side of the vehicle battery as is well known in the art. The switch 42 is intended to be mounted on the vehicle instrument panel and is for the purpose of rendering the valve E inoperative when desired. Ordinarily, the switch 42 is left closed and it will be so assumed during the following description.

The switch F may be of any suitable type and is enclosed in a casing 45 supported on top of the motor M by a bracket 46. The switch F is designed to be opened or closed by means of a lever 47 which is connected to the throttle control linkage by a link 48. The throttle control linkage is mounted on a bracket suitably fastened to the motor M and comprises (see Fig. 1A) a composite lever which consists of a substantially U-shaped bellcrank 50 having an offset arm 51 pivoted thereon at 51'. The bellcrank lever 50 is pivoted on the bracket 49 by a pin 52 and is connected to the accelerator pedal 53 by a link 54 for movement thereby.

The upper end of the arm 51 has pivotal connection with the link 48, the said connecting being axially aligned with the pin 52 as illustrated in Fig. 1A. The lower end of arm 51 is connected by a link 55 with a lever 56 carried by a rod 57 which extends transversely over the top of the motor M and carries on its remote end a lever 58 which is in turn connected through link 59 with the throttle valve control arm 60. A stop 61 is supported on the casing 45 of switch F in such position that the movement of lever 47 is limited to a range of movement just sufficient to open the switch. A movement of one-eighth of an inch has been found sufficient in practice.

It will thus be seen that depression of the accelerator pedal 53 to open the throttle of motor M will effect a forward movement of link 54. Because of the throttle valve return spring (not shown) which is conventionally provided to urge the throttle valve arm 60 to closed position and the frictional resistance in the linkage 55, 56, 57 and 58, the lever 51 will initially tend to move about the point 55' as a pivot and the force exerted at 51' will thrust the link 48 upwardly thereby moving the lever 47 clockwise against the stop 61 and effecting an opening of the circuit through switch F, the latter being in closed position whenever the pedal 53 is in throttle closed position. As soon as the lever 47 comes to rest against the stop 61, the lever 51 can no longer pivot about point 55' and, upon further depression of the accelerator pedal 53, pivots about the lower end of the link 48 which, as aforesaid, is in alignment with the lower pivot of the link 48 and thrusts link 55 upwardly to open the throttle valve through the linkage 56, 57, 58, 59 and 60.

Assuming that the field coil 38 of solenoid S is grounded, it will thus be obvious that solenoid S is energized when pedal 53 is in throttle closed position and that initial throttle opening movement of the accelerator pedal 53 will open the circuit between the wires 40 and 41 and de-energize the solenoid whereupon the valve E, which is opened upon energization of the solenoid, will close. The latter operation will be more fully explained and clarified further on in this specification.

The other side of the solenoid field coil 38 is connected to ground (in this instance the vehicle frame) through wire 62. The latter is grounded on the vehicle in two places through switches K and L respectively, the purpose of which will be now explained. The switch L is mounted on top of the transmission casing T and comprises a switch arm 63 pivotally mounted at 64 in the switch cover 65. A coil spring 66 is arranged about the pin 64 in such manner that the arm 63 is normally biased into contact with the contact element 67 as shown in Fig. 3. The element 67 is in electrical contact with the pin 68 carried by the terminal mounting member 69, the pin 68 being connected to the terminal 71 by the bronze spring connector element 70. The wire 62 is connected to the terminal 71 by a jumper wire 72. The current carrying elements of the switch are suitably insulated from the cover 65 by the members 73.

The lower end of switch arm 63 extends downwardly through the opening 74 into the transmission casing T where it is adapted to be engaged by the forward end of the second-and-high gear shifter rail 75. In Fig. 3, the parts are shown in their positions when the shifter rail 75 is in neutral position, the wire 62 being grounded to the vehicle frame through the switch arm 63. Upon the transmission T being shifted into high gear (or direct drive) the rail 75 will be shifted forwardly of the vehicle and will engage the lower end of the arm 63 causing the same to pivot about the pin 64 against the force of the spring 66 and break the contact between arm 63 and element 67. Such action will of course render the solenoid S inoperative regardless of the position of switch F provided that switch K is also open.

Switch K provides a second connection to ground for the wire 62. The latter is connected to the contact 76 of switch K through wire 62', the other contact 77 being grounded to the vehicle frame. Switch K is governor controlled, the entire mechanism being enclosed in a casing 78 mounted on the bottom of the vehicle floorboard 79.

The governor mechanism G comprises a pair of flyball weights 80 suitably mounted by links 81 in a shaft 82, the latter being driven from the regular speedometer drive cable of the vehicle. The aforesaid speedometer drive cable 83 is driven in the well-known manner from the tail shaft of the transmission T and the drive for the flyball weights 80 is taken off the said cable by cutting the cable and inserting the shaft 82 between the two halves thereof. A pair of gear-sets 84—85 of suitable ratio are provided to drive the shaft 82 and the upper portion of the cable which of course is connected to the speedometer itself (not shown).

The flywheel linkage 81 includes a collar 86 slidable axially of the shaft 82 which is adapted to receive the fork portion of a fork member 87 which is pivoted to the casing 78 at 88. The member 87 is pivotally connected with a link 89 which has pivotal connection at its opposite end with an arm 90 pivoted on the casing 78 at 91. The arm 90 has a flexible extension 92 which carries the movable switch contact 77, a spring member 93 acting to urge the extension element 92 into alignment with the arm 90.

The arrangement is such that the contacts 76—77 are engaged when the vehicle is at rest at which time of course the cable 83 is stationary. As soon as the vehicle starts to move, the cable 83 begins to rotate and the flyballs begin to move outwardly under the influence of centrifugal force as is well understood in the art. The mechanism is designed so that the contacts 76—77 will remain engaged until the vehicle reaches a speed just above normal idling speed of the motor M or above four or five miles per hour, at which time the collar 86 will have moved toward the left of Fig. 3 a sufficient distance to separate the contacts 76—77 and thus break the ground connection of solenoid S through wire 62'. It is thus obvious that the solenoid S will be inoperable when the vehicle is traveling above approximately five miles per hour in high gear.

Referring now again to the vacuum motor D and its associated mechanism, it will be seen that when the solenoid S is de-energized, the plunger 39 thereof is forced upwardly by the spring 94, thus forcing the resilient plunger element 95 against the lower opening passage 97 and closing off communication between the pipe 34 and the valve chamber 98. Vacuum is present in chamber 98 at all times when the motor M is operating and similarly, vacuum is present at all times in the chamber 99 of the regulator valve R in rear of the diaphragm 100 because of the pipe connection 101.

Energization of solenoid S will cause plunger 39 to instantly move downwardly against the spring 94 opening pipe 34 to chamber 98 while at the same time closing the passage 96. The air present in the rearward end of the motor D will thus be evacuated and piston rod 102 will move rearwardly, thereby releasing clutch B. It will be noted that counterclockwise rotation of the cross shaft 18 under the influence of the piston rod 102 of motor D will not effect a depression of pedal 12 because of the lost motion connection 110 between link 16 and arm 17. This connection consists of a slot 111 formed in the forward end of link 16 which engages a pin 112 carried by the upper end of arm 17. From the drawings (Fig. 1) it may be seen that rod 102, arm 22, cross rod 18, bellcrank 17' and link 23 may be actuated by the motor D without disturbing the position of pedal 12. The clutch linkage may of course be manually actuated by the pedal 12 at any time due to the fact that the pin 112 is in the rear of slot 111 when clutch B is in engaged position. A check valve J is provided in connection with motor D for admitting air from the atmosphere into motor D to provide a pressure differential for operation thereof to disengage the clutch.

Clutch B will remain disengaged so long as the solenoid S is energized and motor M is running. De-energization of solenoid S (by opening the switch F) will permit spring 94 to move plunger 39 upwardly thereby closing off chamber 97 from communication between pipe 34 and pipe 35 which leads to the other side of the motor D through the regulator valve R. Depression of the pedal 53 further will tend to speed up the motor M and cause a drop in the vacuum present in chamber 98 of valve E and chamber 99 in valve R, chambers 98 and 99 being connected by pipe 101. This decrease in the vacuum in chamber 99 will permit the spring 103 to unseat the piston 104, the air in chamber 105 back of diaphragm 106 having been evacuated through the bleed port 108. The air in the forward end of the motor D will now flow through pipe 36 and chamber 101 of valve R, through pipe 35, passage 96 of valve E, and pipe 34 to the other side of motor D thereby effecting engagement of clutch B.

From the above description, it will be apparent that I have provided an automatically operated means for releasing the drive of the fluid coupling A under certain conditions of vehicle operation, these conditions being those under which it is normally desirable to effect a release of the drive. In describing the operation of the device as a whole, let it be assumed that the vehicle is at rest with the motor M running and the pedal 53 in throttle closed position. Under these conditions, switch F is closed and solenoid S is energized, both ground switches K and L being closed. The transmission T may be manipulated into low gear (assuming that a conventional three-speed, manually operated gearset is provided) and the pedal 53 depressed whereupon the switch F will be opened thus de-energizing solenoid S and effecting engagement of clutch B. After accelerating the vehicle in low gear, the driver may release the pedal 53 which will return to idle position under the influence of spring 53', closing switch F and energizing solenoid S which will still be grounded through switch L even though the vehicle be traveling at a speed above five M. P. H. The transmission T may then be shifted into intermediate or direct drive and the vehicle accelerated as before. If the shift is made into intermediate speed, clutch B will be disengaged whenever the accelerator pedal 53 is released. If the shift is made into direct, switch L will be opened as described above and clutch B will thereafter remain engaged regardless of the position of the pedal 53 provided that the speed of the vehicle is above five M. P. H.

Upon coming to a stop at a traffic light or for other reason, the drive will be released without effort on the part of the driver as soon as the vehicle reaches a speed below five M. P. H. with the pedal 53 in idle position.

The above described invention eliminates the difficulties present in prior fluid coupling driving arrangements such as "creep" of the vehicle at engine idling speeds, clashing of gears during shifting, overheating of the fluid, etc. It also makes possible a simpler and more economical fluid coupling construction because all need for baffle elements and other devices for interrupting the circulation of the fluid at low engine speeds is eliminated.

In addition to these and the aforesaid advantages, a more flexible and more easily operated vehicle power transmission is provided.

Other modifications and changes will be readily apparent to those skilled in the art from the description herein which is for illustrative purposes only, and it is not intended to limit the invention in its broader aspects except as set forth in the claims appended hereto.

I claim:
1. In a motor vehicle drive mechanism including a variable speed ratio transmission and a fluid coupling, power operated means for releasing the drive of said coupling; electrically operable means for controlling the operation of said power operated means; a throttle control element on said vehicle adapted to be manipulated by the driver thereof; a switch connecting one side of said electrically controlled means with a source of electrical energy and adapted to be closed when said throttle control element is in throttle closed position and to be opened when said element is moved toward open throttle position, and means for automatically rendering said electrically operable means inoperable upon the manipulation of said transmission into high speed ratio driving position at a speed in excess of approximately five miles per hour.

2. In a motor vehicle drive mechanism including a variable speed ratio transmission and a fluid coupling, power operated means for releasing the drive of said coupling; a solenoid for controlling the operation of said power operated means; a source of electrical energy; a circuit connecting said source with said solenoid; a driver operated throttle control element; a switch in the circuit between said source and one side of said solenoid adapted to be closed upon movement of said throttle control element to throttle closed position; a switch in the circuit between said source and the other side of said solenoid, said second switch being automatically opened upon the vehicle attaining a speed in excess of idling speed.

3. In a motor vehicle drive mechanism including a variable speed ratio transmission and a fluid coupling, power operated means for releasing the drive of said coupling; a solenoid for controlling the operation of said power operated means; a source of electrical energy; a circuit connecting said source with said solenoid; a driver operated throttle control element; a switch in the circuit between said source and one side of said solenoid adapted to be closed upon movement of said throttle control element to throttle closed position; a switch in the circuit between said source and the other side of said solenoid, said second switch being automatically opened upon said transmission being shifted into high speed ratio drive.

4. In a motor vehicle drive mechanism including a variable speed ratio transmission and a fluid coupling, power operated means for releasing the drive of said coupling; a solenoid for controlling the operation of said power operated means; a source of electrical energy; a circuit connecting said source with said solenoid; a driver operated throttle control element; a switch in the circuit between said source and one side of said solenoid adapted to be closed upon movement of said throttle control element to throttle closed position; a pair of switches connected in parallel in the circuit between said source and the other side of said solenoid, one of said pair of switches being automatically opened upon the vehicle attaining a speed in excess of idling speed and the other of said pair of switches being opened upon the shifting of said transmission into high speed ratio drive.

5. In a motor vehicle drive mechanism including a variable speed ratio transmission and a fluid coupling, vacuum operated means for releasing the drive of said coupling including a vacuum motor and a valve for controlling the admission of vacuum to said motor; a solenoid for controlling said valve; a throttle control element; means operably associated with said element and operable upon movement of said element to idle position for energizing said solenoid to open said valve, and means for maintaining said solenoid de-energized during the driving of said vehicle in high speed driving ratio at a speed in excess of idling speed.

6. In a motor vehicle drive mechanism including a variable speed ratio transmission and a fluid coupling, means for releasing the drive of said coupling; electrically operated means for controlling said releasing means; a throttle control element; a switch for energizing said electrically operated means; and a linkage interconnecting said switch and said throttle control element, said linkage being constructed and arranged to open said switch upon initial throttle opening movement of said throttle control element and to close said switch upon return of said element to throttle closed position.

7. In a motor vehicle power transmission mechanism, electrically operated means for releasing the drive of said transmission; a switch for controlling said electrically operated means; a throttle control lever; a bellcrank lever pivoted on said vehicle and having one arm operably connected to said throttle control lever; a lever pivoted between its ends on the other arm of said bellcrank lever, one end of said lever being operably connected to said switch and the other end being operably connected to a throttle actuating linkage whereby initial movement of said throttle control lever in a direction tending to open the throttle will actuate said switch.

CARL A. NERACHER.